United States Patent [19]
Huff

[11] 3,731,831
[45] May 8, 1973

[54] TRAILER
[75] Inventor: Arlen L. Huff, South Bend, Ind.
[73] Assignee: Sellers Manufacturing Inc., Wakarusa, Ind.
[22] Filed: Apr. 1, 1971
[21] Appl. No.: 130,263

[52] U.S. Cl. ...................214/506, 296/37, 280/494
[51] Int. Cl. ..............................................B60p 1/28
[58] Field of Search.....................214/505, 506, 501, 214/85; 296/24, 37; 280/462–466, 494, 491

[56] References Cited

UNITED STATES PATENTS

| | | | |
|---|---|---|---|
| 3,342,508 | 9/1967 | Thomas | 214/505 X |
| 3,584,753 | 6/1971 | Voeller | 214/505 X |
| 3,245,713 | 4/1966 | Ogilvie | 296/24 R |
| 2,851,181 | 9/1958 | Thomann | 214/506 |
| 3,285,447 | 11/1966 | Junion | 214/506 |

FOREIGN PATENTS OR APPLICATIONS

| | | | |
|---|---|---|---|
| 724,808 | 9/1942 | Germany | 214/506 |

*Primary Examiner*—Albert J. Makay
*Attorney*—Marmaduke A. Hobbs and Maurice W. Green

[57] ABSTRACT

A trailer for use primarily for transporting vehicles such as snowmobiles, in which a bed is mounted on an undercarriage with the wheels of the undercarriage near the longitudinal center and in which an opening is provided at the front and rear ends of the bed for unloading and loading a snowmobile. A draw bar is pivotedly connected to the underside of the bed and is adapted to swing laterally with respect to the bed to permit the bed to tilt both forwardly and rearwardly for unloading and loading a vehicle. The wheels may be positioned laterally beyond the basic part of the bed, and a fender - compartment combination having a longitudinal cover thereon is mounted over each of the two wheels.

11 Claims, 11 Drawing Figures

Patented May 8, 1973
3,731,831
4 Sheets-Sheet 1
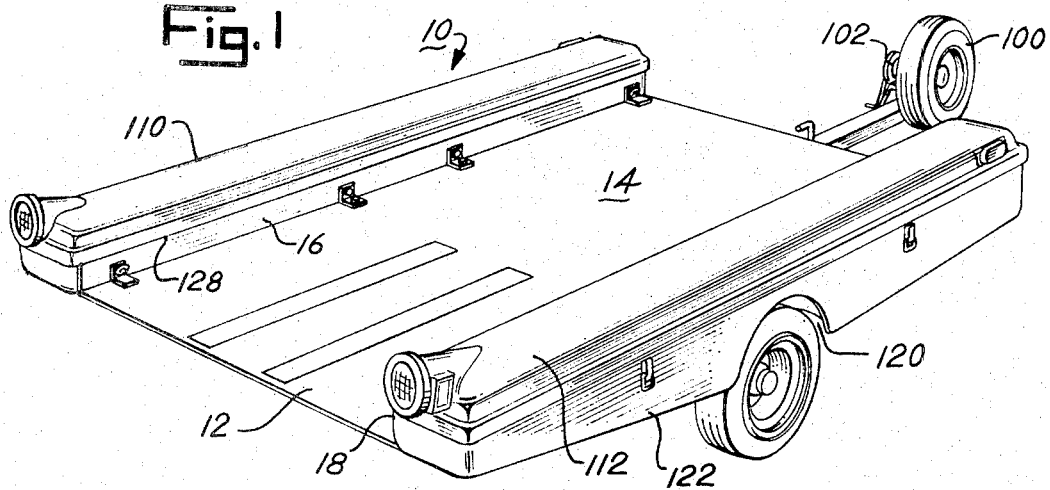
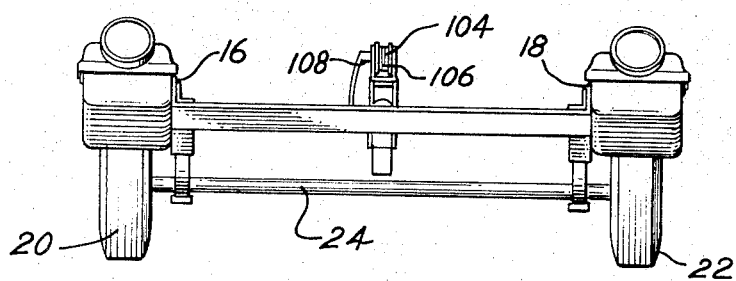
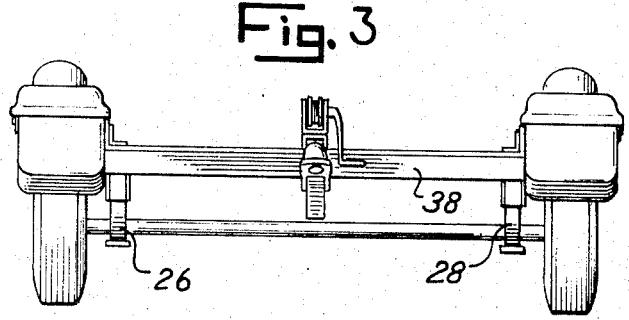
INVENTOR.
ARLEN L. HUFF
BY Hobbs & Green
ATTORNEYS

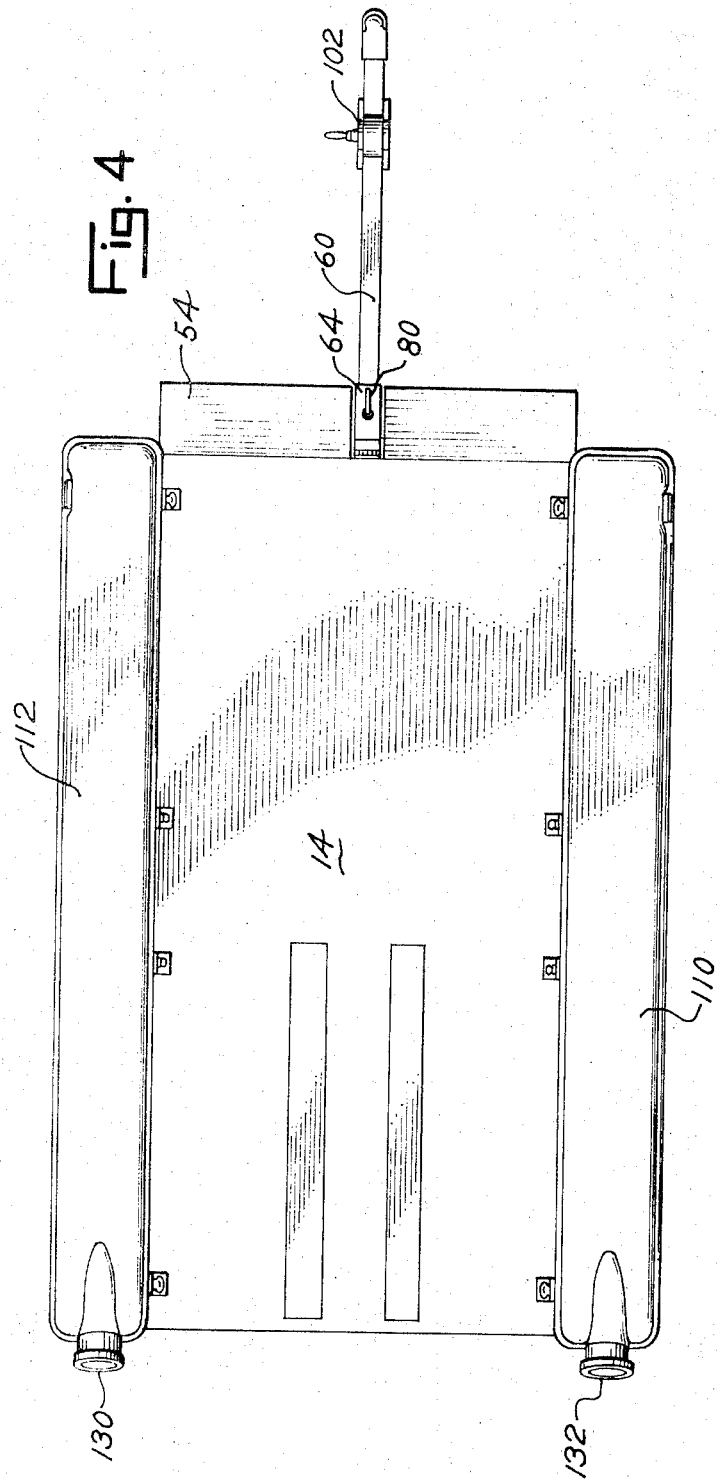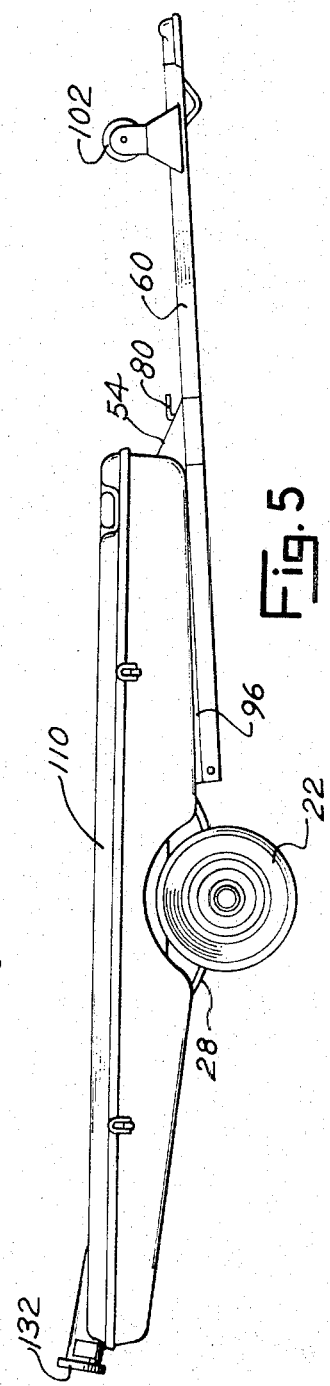

INVENTOR.
ARLEN L. HUFF
BY Hobbs & Green
ATTORNEYS

Patented May 8, 1973
3,731,831
4 Sheets-Sheet 4
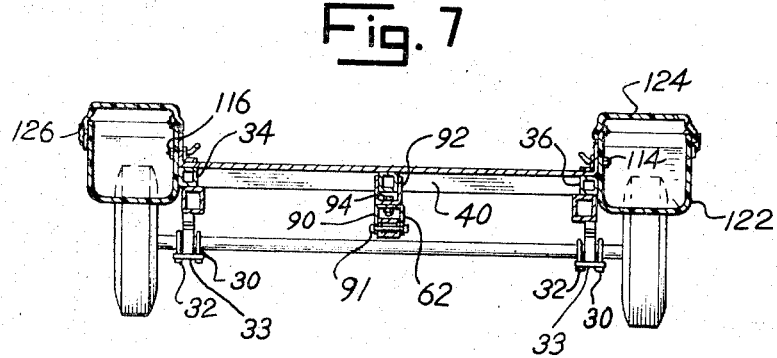
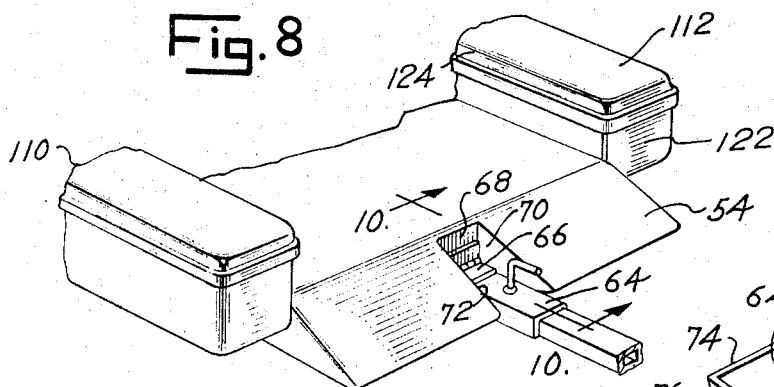
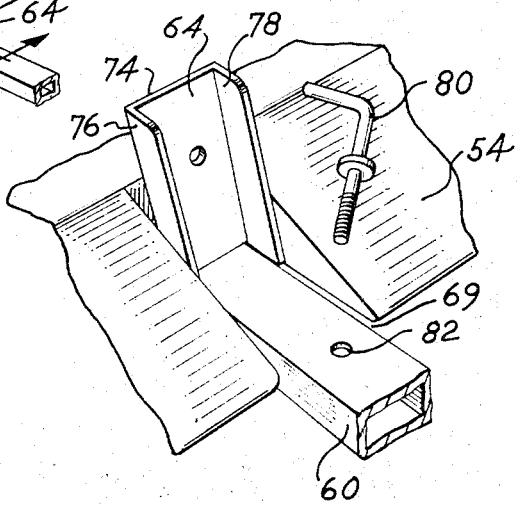
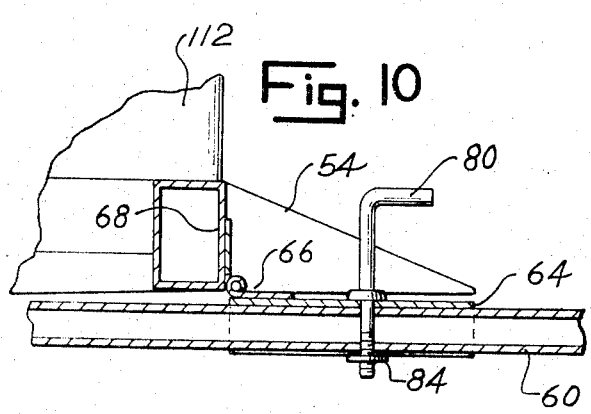
INVENTOR.
ARLEN L. HUFF
BY Hobbs & Green
ATTORNEYS

TRAILER

Snowmobiles, dune buggies and other vehicular equipment, are often transported by the owners to and from their homes and to and from recreational and rural areas, frequently from day to day or week to week, often on a truck or trailer. Conventional flat bed trailers are unsatisfactory or inconvenient to use, since unloading the forward facing vehicle is difficult in that it must be manually and physically backed off the trailer or truck onto the ground which is often soft earth and sometimes covered with a thick blanket of snow, resisting the movement of the vehicle. Even when the towing vehicle, such as an automobile or truck, has been disconnected from the trailer, the tongue or draw bar prevents the transported vehicle from being easily or effectively removed forwardly from the trailer, and usually prevents the trailer from tipping forwardly sufficiently to permit the forward end to be positioned near the ground. It is therefore one of the principal objects of the invention to provide a trailer for snowmobiles, dune buggies and other vehicular equipment, which tilts both forwardly and rearwardly to place the front and rear edges of the trailer bed adjacent the ground, so that the equipment can mount and leave the trailer in its forward direction and under its own power, and which retains the bed in a substantially level position when the equipment is loaded on the trailer.

Another object of the invention is to provide a trailer for vehicular equipment, having a drawbar which can pivot to either side of the trailer so that it will not interfere with forward tilting of the trailer, and which can pivot downwardly to place the forward end of the trailer in a position clear of the towing vehicle so that the equipment can be removed forwardly from the trailer while the trailer is still coupled to the vehicle.

Still another object of the invention is to provide a trailer of the aforementioned type, which can be tilted both forwardly and rearwardly without uncoupling the trailer from the towing vehicle, and which retains the draw bar in a firm, fixed forward position when the trailer is being towed and readily releases the draw bar so that it can be swivelled to either side without lifting the adjacent end of the trailer bed to release the bar.

Another object is to provide a relatively simple, easily handled and versatile trailer which can be operated by one man to load and unload vehicular equipment and is safe to operate in adverse road and field conditions either in its loaded or unloaded condition, and which includes means utilizing normally unused space for accessories, tools, and gear for snowmobiling.

Additional objects and advantages of the invention will become apparent from the following description and accompanying drawings, wherein:

FIG. 1 is a perspective view of the present trailer;

FIG. 2 is a rear elevational view of the trailer shown in FIG. 1;

FIG. 3 is a front elevational view of the trailer shown in FIGS. 1 and 2;

FIG. 4 is a top plan view of the present trailer;

FIG. 5 is a side elevational view;

FIG. 7 is a vertical cross sectional view, the section being taken on line 7—7 of FIG. 6;

FIGS. 8 and 9 are enlarged fragmentary perspective views of the trailer, showing the manner in which the draw bar or tongue is used and operated;

FIG. 10 is a fragmentary cross sectional view of the trailer, the section being taken on line 10—10 of FIG. 8.

Figure 6:
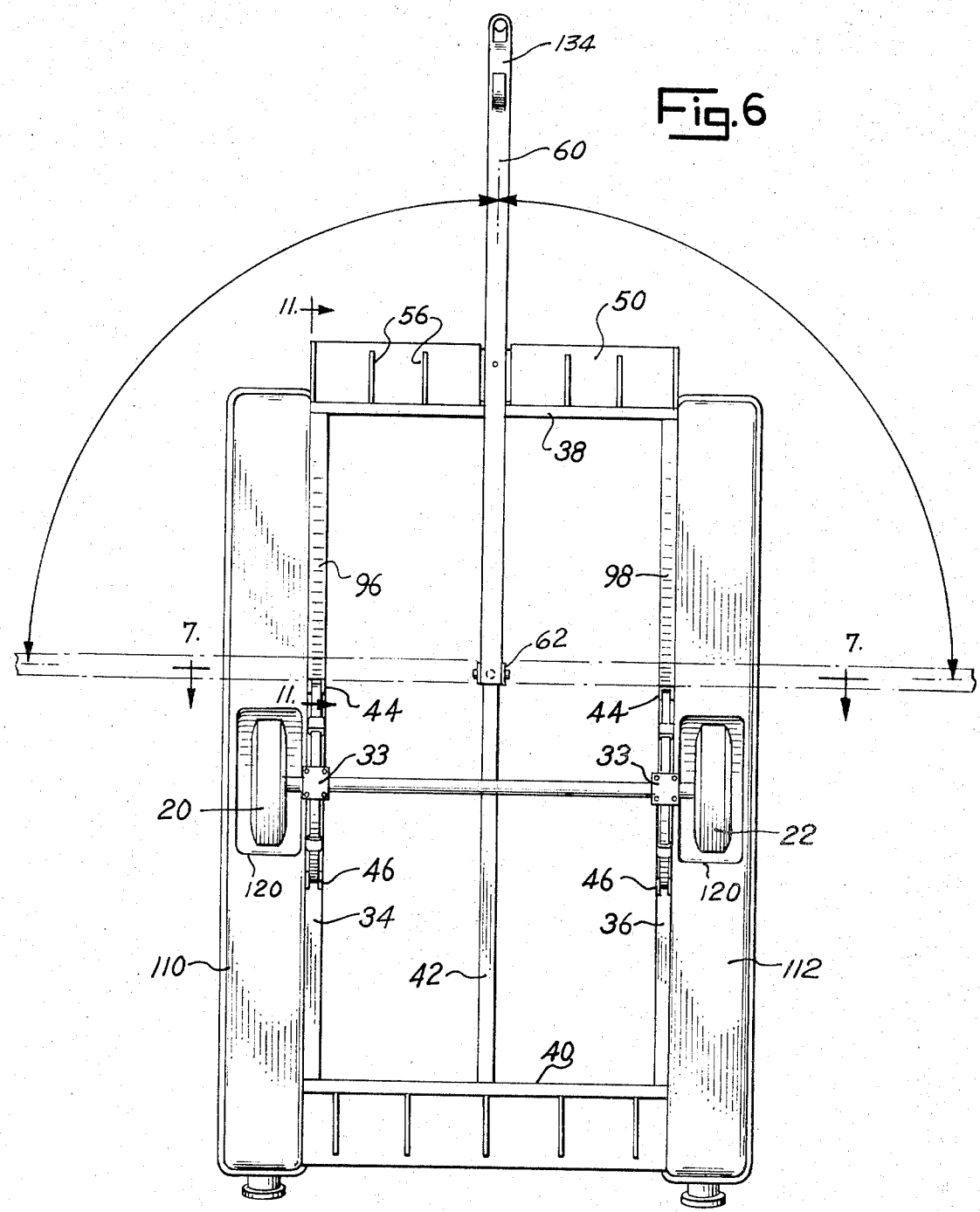
FIG. 6 is a bottom view of the trailer, illustrating the manner in which it operates.

Referring more specifically to the drawings, numeral 10 indicates generally the present trailer, 12 a bed of the trailer having a floor 14 and sides 16 and 18. The bed is mounted on an undercarriage consisting of wheels 20 and 22 journalled on an axle 24, which is connected to the underside of the bed by leaf spring assemblies 26 and 28. The undercarriage may be considered conventional for the purpose of the present description, and will not be described in greater detail herein. The spring assemblies are secured to the axle by U bolts 30 and 32 and plates 33. The floor 14 and the two side walls 16 and 18 may be constructed of plate or sheet metal or plywwod, and the floor is preferably reinforced by perimeter beams 34 and 36, and end beams 38 and 40, the perimeter and end beams preferably being of steel, such as square tubular shaped members, joined together at their ends by welding to form a rigid structure. A center reinforcing beam 42, joined at its ends to end beams 38 and 40 by welding, is preferably included under the floor to give substantial longitudinal strength to the floor structure. The spring assemblies 26 and 28 are connected by hangers 44 and 46 to the respective perimeter beams.

The forward end of the bed is preferably provided with aprons 50, consisting of a downwardly extending plate 54 joined rigidly with front cross member 38 and held in a rigid position by a plurality of reinforcing members 56 on the underside of plate 54. The apron permits the snowmobile, dune buggy or other vehicular equipment to be driven on and off the bed without any substantial step or obstacle from the edge of the floor.

The trailer is towed by draw bar or tongue 60 attached to reinforcing member 42 by a double pivoting mechanism 62. The draw bar is preferably of tubular steel and is held in its forwardly extending position for towing by a securing mechanism consisting of a member 64 pivoted by a hinge 66 to the front side 68 of beam 38 in slot 69 disposed in apron 54 and partially enclosed by webs 70 and 72 joined to the apron and front beam. Webs 70 and 72 are preferably of steel plate and are welded or otherwise rigidly secured to the apron structure and to the beam. Member 64 is provided with an upper plate-like portion 74 and two downwardly projecting flanges 76 and 78 which extend downwardly on the opposite sides of draw bar 60 and are held in the downward position by an L-shaped screw 80 which extends downwardly through holes 82 in the draw bar to a nut or other threaded structure 84 on the underside of the draw bar.

In order to permit the bed of the trailer to tilt forwardly so that the snowmobile, for example, can be unloaded from the forward end of the bed, the draw bar is swiveled on pivoted latch connection 62 so that the draw bar can be swung to either side, as illustrated in FIG. 6. This swiveling operation can be performed without manually lifting the front end of the bed or floor to release the bar, as is normally required in prior trailers of this general type. The pivoted latch 62 consists of a U-shaped member 90 pivotally secured by a pin 91 or other suitable securing means to the inner end of the draw bar, a U-shaped member 92 secured by welding or other suitable securing means to reinforcing member 42, and a bolt or screw 94 interconnecting the intermediate portions of the two U-shaped members 90 and 92. The bolt or pivot pin 94 permits the free movement of the draw bar to either side. When the draw bar is extending forwardly and member 64 is secured in place as illustrated in FIGS. 8 and 10, the draw bar is held firmly in its forward position so that full control of the trailer can be maintained as it is being towed by an automobile, truck or other vehicle.

Figure 11:
FIG. 11 is a fragmentary elevational view of a rub rail for the draw bar.

Since the draw bar is often moved to and from its laterally extended position with a load on the trailer often positioned forwardly of the axle, rub rails 96 and 98 are provided on the right and left sides of the under frame, preferably welded or bolted directly to perimeter beams 36 and 38, the two rails being engaged by the upper surface of the draw bar as it is moved in the manner as illustrated in FIG. 6. This assists in giving stability to the trailer while it is being positioned for tilting forwardly with the draw bar in one of the two lateral positions. The two rub rails taper from a thickness of approximately 2 or 3 inches near the undercarriage to substantially the same level as the underside of the perimeter beams at the forward end of the bed, as illustrated in FIG. 11.

The draw bar is shown with a spare tire 100 mounted on the forward end thereof, which does not interfere with the movement or use of the draw bar for towing or with the swinging of the draw bar to either side as described. A reel 102 is also mounted on the forward end of the draw bar for facilitating loading and unloading of the snowmobile or other vehicle onto the bed. The reel is of conventional construction, having a spool 104 and cable 106 and a handle 108 for winding the cable on the spool.

In order to utilize the full capacity of the trailer, fender-compartments 110 and 112 are mounted on opposite sides of the bed and secured thereto by a plurality of bolts 114 and 116 extending through sides 16 and 18 and through the sides of the compartments. Each compartment extends the full length of the bed and is provided with an upwardly extending recessed portion 120 for accommodating the wheels. The compartments may be constructed of any suitable material; however, fiberglass has been found satisfactory for this purpose. The body portion 122 of the compartment is closed by a cover 124 secured to the body by latches 126 and hinges 128 spaced along the inner side of the cover and body. In the embodiment illustrated in the drawings, tail lights 130 and 132 are mounted on the covers of the two compartments, 112 and 110, respectively. The trailer may be used with or without the two compartments 110 and 112, and standard fenders or mud guards would normally be used over the wheels when the two compartments are not mounted on the trailer.

A hitch 134 rigidly connected to the forward end of draw bar 60 is used to connect the trailer to a towing vehicle such as an automobile. The trailer can be easily towed by the automobile and readily disconnected by a simple manipulation of the hitch which, for the purpose of the present invention, may be considered as conventional in construction and operation.

In the use of the present trailer, a snowmobile, dune buggy or other equipment, is normally loaded from the rear, and in order to permit the rear end of the bed to be lowered to the ground, screw 80 is removed from draw bar 60 and member 64, thereby permitting the draw bar to pivot on pivot pin or bolt 91. This tilting operation can be performed without disconnecting the forward end of the draw bar from the towing vehicle. The snowmobile, or other vehicular equipment is then pulled onto the bed by the cable 106 of reel 104, and straps or other suitable securing means attached to anchor bolts at the two ends of the bed, are preferably used to tie down the equipment firmly so that the trailer and loaded equipment can be towed safely over adverse road conditions without any danger of the equipment being displaced from the trailer. When the equipment is to be removed from the trailer, latch 62 is released and raised to free the draw bar and the trailer is maneuvered to a position at which the draw bar is extending laterally to one of the positions illustrated in FIG. 6. The draw bar is not necessarily disconnected from the towing vehicle during the unloading operation. With the draw bar in the laterally extending position, the bed can readily tilt forwardly with the forward edge thereof adjacent the ground so that the snowmobile or other transported equipment can safely and easily be removed from the bed. The bed can also be tilted in the rearward direction to permit loading without changing the position of the trailer with respect to the towing vehicle. After the equipment has been loaded on the trailer, the vehicles are maneuvered to place the draw bar in its forwardly extending position where it is locked firmly in place by latch 62 and screw 80 in the manner illustrated in FIGS. 8 and 10.

In the embodiment of the invention illustrated in the drawings and described in detail herein, the bed is shown the size of a single snowmobile; however, the bed and undercarriage may be made of sufficient width to permit two snowmobiles to be loaded and transported in a side by side relationship. The basic construction and operation of the trailer are the same for either the single or the double snowmobile models. Snowmobiles have been mentioned frequently herein for the purpose of illustrating the use and operation of the trailer; however, the trailer can be satisfactorily used for transporting a variety of different types of vehicles and equipment.

While only one embodiment of the present trailer has been described in detail herein, various changes and modifications may be made without departing from the scope of the invention.

I claim:

1. A trailer for snowmobiles, dune buggies and similar vehicles, comprising an undercarriage, having a wheel on each side, a bed mounted and tiltable fore and aft on said undercarriage and having an opening at the front and rear ends thereof for loading and unloading said vehicles, a draw bar extending forwardly from said bed, means for connecting said draw bar to said bed including a means for holding said draw bar for movement from its forwardly extending position to a retracted position to permit the forward edge of said bed to tilt downwardly to a point near ground level, and means for retaining said draw bar in its forwardly extending position for towing the trailer and for releasing the draw bar for free pivoting movement to either side to permit the front end of the bed to be lowered to load and unload a vehicle.

2. A trailer as defined in claim 1 in which said means for holding said draw bar includes a pivoted means on the underside of said bed for swiveling said draw bar from its forwardly extending position to a lateral position.

3. A trailer as defined in claim 2 in which said pivot means includes a pin on a vertical axis and in which said draw bar pivots freely to a position at right angles to the longitudinal center line of the trailer on either side thereof.

4. A trailer as defined in claim 2 in which a rub rail is provided on the underside of the bed along the outside edges thereof between the respective wheel and the forward end of the bed.

5. A trailer as defined in claim 1 in which the two wheels are positioned substantially at the longitudinal center of the said bed.

6. A trailer as defined in claim 2 in which said means for releasably retaining said draw bar in its forward position includes a member pivotedly connected on a horizontal, transverse axis for seating on the upper surface of said draw bar, and a means for securing said last mentioned member to said draw bar.

7. A trailer as defined in claim 1 in which said bed includes a horizontally positioned floor and the wheels are disposed outwardly from said floor and a fender-compartment is mounted on said bed above each of said wheels.

8. A trailer as defined in claim 2 in which said means for movably holding said draw bar includes a pin on a horizontal axis which permits the bed to tilt upwardly and rearwardly with respect to the draw bar.

9. A trailer as defined in claim 1 in which a reel is mounted on the forward end of said draw bar for assisting in loading a vehicle on said bed.

10. A trailer as defined in claim 7 in which said fender-compartments have covers hinged longitudinally thereon.

11. A trailer as defined in claim 10 in which tail light means is provided in each of said covers and formed integrally therewith.

* * * * *